(12) United States Patent
Vacchi et al.

(10) Patent No.: US 12,197,898 B2
(45) Date of Patent: Jan. 14, 2025

(54) CROSS-VALIDATING FILES TO FACILITATE CODE GENERATION

(71) Applicant: Red Hat, Inc., Raleigh, NC (US)

(72) Inventors: Edoardo Vacchi, Milan (IT); Paolo Antinori, Milan (IT)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 17/716,779

(22) Filed: Apr. 8, 2022

(65) Prior Publication Data

US 2023/0325156 A1    Oct. 12, 2023

(51) Int. Cl.
| | | |
|---|---|---|
| *G06F 8/35* | (2018.01) | |
| *G06F 8/41* | (2018.01) | |
| *G06F 11/36* | (2006.01) | |

(52) U.S. Cl.
CPC .............. *G06F 8/35* (2013.01); *G06F 8/42* (2013.01); *G06F 8/436* (2013.01); *G06F 11/3604* (2013.01)

(58) Field of Classification Search
CPC ... G06F 8/35; G06F 8/42; G06F 8/436; G06F 8/433; G06F 8/434; G06F 8/75; G06F 11/3604; G06F 11/3608; G06F 11/3668
USPC ........................................................ 717/104
See application file for complete search history.

(56) References Cited

U.S. PATENT DOCUMENTS

| | | | |
|---|---|---|---|
| 7,827,206 B2 | 11/2010 | Holmes et al. | |
| 7,865,820 B2 | 1/2011 | Sauer et al. | |
| 8,196,126 B2 | 6/2012 | Ziegler | |
| 8,332,864 B2 * | 12/2012 | Bose | G06Q 10/06 718/100 |
| 8,402,064 B2 | 3/2013 | Addala et al. | |
| 8,417,715 B1 * | 4/2013 | Bruckhaus | G06Q 10/04 705/26.1 |
| 8,578,346 B2 * | 11/2013 | Chao | G06F 8/10 717/132 |
| 9,411,707 B1 * | 8/2016 | Hale | G06F 8/75 |

(Continued)

OTHER PUBLICATIONS

Hafidhoh, N. et al., "Source Code Generator for Automating Business Rule Implementation," 2015 International Conference on Data and Software Engineering, Nov. 25-26, 2015, Yogyakarta, Indonesia, IEEE, pp. 219-224.

(Continued)

*Primary Examiner* — Jason D Mitchell
(74) *Attorney, Agent, or Firm* — Dority & Manning, P.A.

(57) ABSTRACT

In various examples disclosed herein, provided is a method and system for cross-validating files to facilitate code generation. The system can perform the cross-validation in phases of disparate files to enable the interoperability of the files. The files can include representations of tasks that are organized differently and differ in format and semantics. The method and system described herein can perform syntax and semantic validation on the files to check for errors, and then identify terms and names identified in the tasks associated with the files along with signatures (e.g., schemas for data models or function signatures for function invocations) associated with the names. After error checking is complete, and after the names and signatures are identified, the names and signatures in the respective files can be cross-validated to find matching tasks, and code is generated that utilizes the cross-validated and matching tasks.

14 Claims, 5 Drawing Sheets

(56) References Cited

U.S. PATENT DOCUMENTS

| | | | |
|---|---|---|---|
| 11,023,831 B2 | 6/2021 | Farooq et al. | |
| 11,237,883 B2* | 2/2022 | MacLeod | G06F 8/71 |
| 2011/0119649 A1* | 5/2011 | Kand | G06F 8/71 |
| | | | 717/100 |
| 2017/0091180 A1* | 3/2017 | Yamaguchi | G06F 40/55 |
| 2017/0351980 A1* | 12/2017 | Binder | G06F 16/86 |
| 2018/0032055 A1* | 2/2018 | Janssen | G06F 8/436 |
| 2018/0039921 A1* | 2/2018 | Mos | G06Q 10/103 |
| 2018/0349113 A1* | 12/2018 | Boo | G06F 8/51 |
| 2020/0081821 A1* | 3/2020 | Fujimoto | G06F 11/327 |
| 2021/0073285 A1* | 3/2021 | Hunter | G06F 8/65 |
| 2022/0334810 A1* | 10/2022 | Wittmann | G06F 8/35 |
| 2022/0334811 A1* | 10/2022 | Antinori | G06F 8/427 |

OTHER PUBLICATIONS

Vacchi, E., "Kogito: A Modular Codegen Design Proposal," Apr. 23, 2020, https://evacchi.github.io/compilers/kogito/2020/04/23/kogito-codegen-design.html, 6 pages.

Weber, D. et al., "Static Syntax Validation for Code Generation with String Templates," International SDL Forum, Sep. 2017, 13 pages.

* cited by examiner

CROSS-VALIDATING FILES TO FACILITATE CODE GENERATION

BACKGROUND

Business process modeling is the activity of representing processes of an enterprise so that current business processes may be analyzed, improved, and automated. Business process modeling provide business users with the ability to model theft business processes, implement and execute those models, and refine the models based on as-executed data.

SUMMARY

In various examples disclosed herein, provided is a method and system for cross-validating files (e.g., source files or assets comprising information about business processes) to facilitate code generation. The system can perform the cross-validation in phases of disparate files to enable the interoperability of the files. The files can include representations of tasks that are organized differently and differ in format and semantics. The method and system described herein can perform syntax and semantic validation on the files to check for errors, and then identify terms and names identified in the tasks associated with the files along with signatures (e.g., schemas for data models or function signatures for function invocations) associated with the names. After error checking is complete, and after the names and signatures are identified, the names and signatures in the respective files can be cross-validated to find matching tasks, and then code is generated that utilizes the cross-validated and matching tasks.

In an example, a method includes receiving, by a computing system comprising one or more processor devices of one or more computing devices, a first file comprising information related to a first process in a first notation system and a second file comprising information related to a second process in a second notation system. The method also includes error checking for each of the first file and the second file to determine whether there is an error in the first file and the second file. The method also includes identifying a first set of tasks in the first process and a second set of tasks in the second process. The method also includes cross-validating the first set of tasks and the second set of tasks to determine that the first set of tasks and the second set of tasks contain matching tasks. The method also includes, in response to a successful completion of error checking and determining there are matching tasks, generating code to be executed that will utilize the matching tasks from the first file and the second file.

In an example, a computing system includes one or more computing devices, the one or more computing devices comprising one or more processor devices, the one or more processor devices to receive a first file comprising information related to a first process in a first notation system and a second file comprising information related to a second process in a second notation system. The processor devices also error check each of the first file and the second file to determine whether there is an error in the first file and the second file. The processor devices also identify a first set of tasks in the first process and a second set of tasks in the second process. The processor devices also cross-validate the first set of tasks and the second set of tasks to determine that the first set of tasks and the second set of tasks contain matching tasks. The processor devices also, in response to a successful completion of error checking and determining there are matching tasks, generate code to be executed that will utilize the matching tasks from the first file and the second file.

In an example, a non-transitory computer-readable storage medium includes executable instructions to cause one or more processor devices of one or more computing devices to receive a first file comprising information related to a first process in a first notation system and a second file comprising information related to a second process in a second notation system. The instructions further cause the one or more processor devices to error check each of the first file and the second file to determine whether there is an error in the first file and the second file. The instructions further cause the one or more processor devices to identify a first set of tasks in the first process and a second set of tasks in the second process. The instructions further cause the one or more processor devices to cross-validate the first set of tasks and the second set of tasks to determine that the first set of tasks and the second set of tasks contain matching tasks. The instructions further cause the one or more processor devices to, in response to a successful completion of error checking and determining there are matching tasks, generate code to be executed that will utilize the matching tasks from the first file and the second file.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply an initial occurrence, a quantity, a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B. The word "data" may be used herein in the singular or plural depending on the context.

Business process modeling is the activity of representing the processes of an enterprise, where the processes can be a series of tasks, events, conditions, and other activities that are recorded and tracked in a manner that can enable analysts to better understand the systems and operations of the enterprise. There are many different methodologies and notation systems that can be used to track, model, and simulate the processes, and in a cloud-oriented business process automation platform, these can lead to a large set of heterogenous source files that are not necessarily interoperable. Even files that use the same methodology or notation system may not be interoperable since the files may contain references to different files that are not compatible.

During business process modeling, the operational specifications of business processes can be captured and the data of business processes, known as "artifacts", can be described by characterizing business-relevant data objects, their lifecycles, and related services. Business process modeling tools provide business users with the ability to model their business processes, implement and execute those models, and refine the models based on as-executed data. As a result, business process modeling tools can provide transparency into business processes, as well as the centralization of corporate business process models and execution metrics. The business process modeling tools can also enable simulation functionality that allows for pre-execution modeling and simulation to explore "what-if" scenarios with different inputs. Once the modeling and simulation is performed, the files comprising the processes can be utilized at run-time on when performing business process automation.

Performing the modeling and simulation during a pre-processing phase and producing code-generated artifacts to facilitate the business process automation can avoid excessive processing at run-time. However, the diverse nature of the files can make it difficult to share processing information across the different pre-processors. This can lead to ad-hoc implementations that cannot interoperate easily.

In various examples disclosed herein, provided is a method and system for phased cross-validation of disparate files to enable the interoperability of the files. The files can include representations of tasks that are organized differently and differ in format and semantics. The method and system described herein can perform syntax and semantic validation on the files to check for errors, and then identify terms and names identified in the tasks associated with the files along with signatures (e.g., schemas for data models or function signatures for function invocations) associated with the names. After error checking is complete, and after the names and signatures are identified, the names and signatures in the respective files can be cross-validated to find matching tasks, and code can be generated that utilizes the cross-validated and matching tasks.

Figure 1:
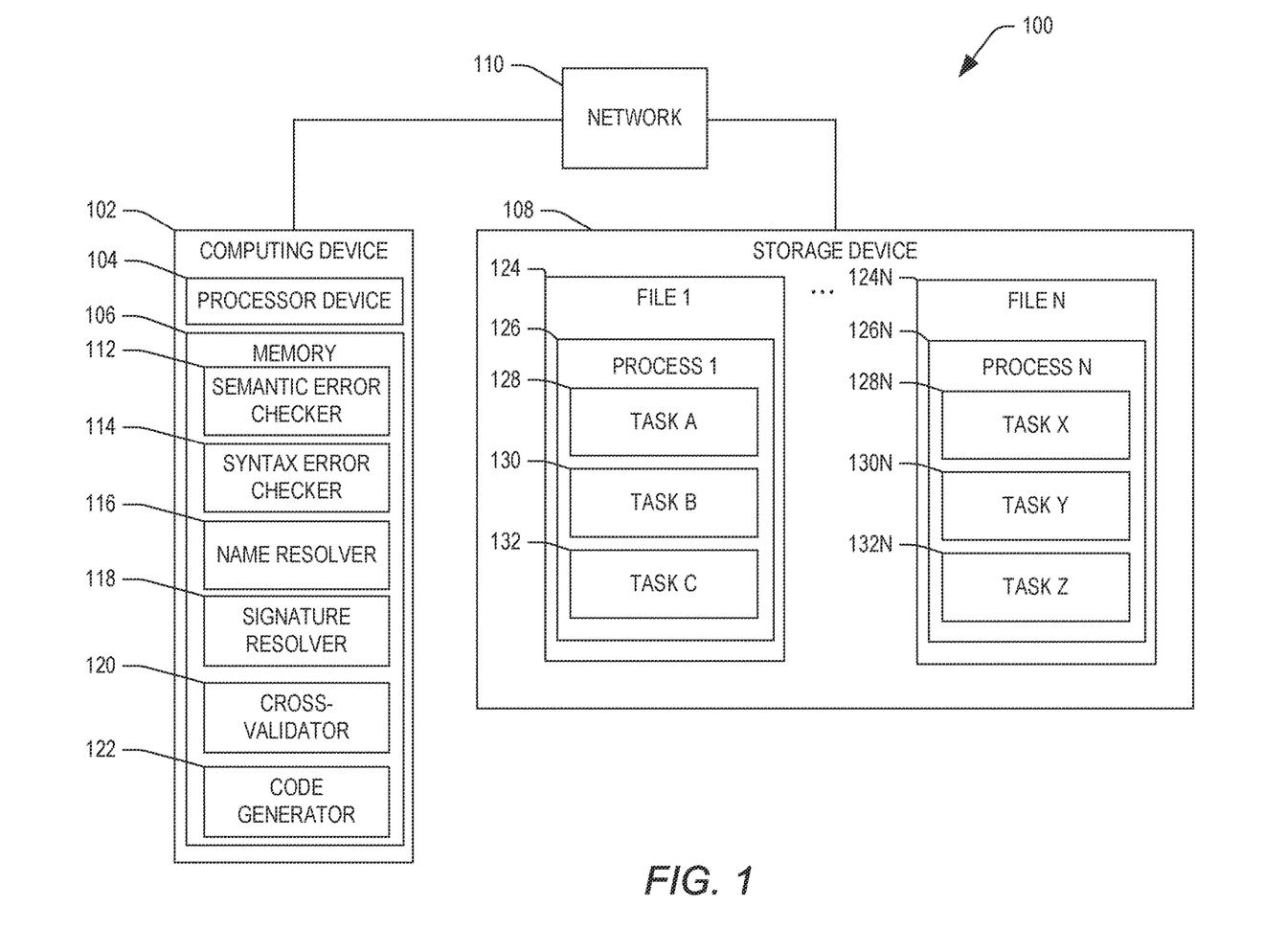
FIG. 1 illustrates a block diagram of an example computing system for cross-validating files to facilitate code generation in accordance with various aspects of the subject disclosure.

Turning now to FIG. 1, illustrated is a block diagram of an example computing system 100 for cross-validating files to facilitate code generation. The computing system 100 includes a computing device 102, which in turn includes a processor device 104 and a memory 106. The computing device 102 may include, or be communicatively coupled to, a storage device 108. In some examples, the computing device 102 may access the storage device 108 via a network 110. The memory 106 can include a semantic error checker 112, a syntax error checker 114, a name resolver 116, a signature resolver 118, a cross-validator 120, and a code generator 122.

The storage device 108 can include files 124-124N that each comprise information associated with processes 126-126N. The processes 126-126N can respectively contain information related to the processes 126-126N, which are represented in FIG. 1 by tasks 128-128N, 130-130N, and 132-132N. It is to be appreciated that in some examples, the file 124 can contain information related to additional processes other than the process 126. Similarly, while processes 126-126N are depicted as comprising 3 tasks each (e.g., the tasks 128-128N, 130-130N, and 132-132N), in other examples, the processes 126-126N can comprise differing numbers of tasks. It is also to be appreciated that while the processes 126-126N are depicted in FIG. 1 as merely comprising tasks, this is merely for simplicity of depiction, and it is to be appreciated that the tasks 128-128N, 130-130N, and 132-132N can represent any steps in a business process, including flow objects (e.g., events, activities, and gateways), connecting objects (e.g., sequence flow, message flow, association), swim lanes, artifacts, decision steps, and other elements of a business process.

In an example, the files 124-124N can be in one or many different formats, using different notation systems or structures. For example, the files 124-124N can include one or more of Decision Modeling and Notation (DMN) files, Business Process Model Notation (BPMN) files, Predictive Model Markup Language (PMML) files, rules files written using Drools Rules Language (DRL), or files using other formats or notation systems. The DMN files can facilitate automated decisioning, the BPMN files can be used to encode business processes, the PMML files can be used to describe predictive models, and the DRL files can comprise information related to a business rule management system. A business process automation platform can use these files, but due to the differences in syntax, semantics, names, and signatures, these files may not be interoperable. The cross-validation and code generation method and system disclosed herein can ensure the interoperability of the files, and also reduce the processing demands at runtime of the business process automation platform by generating the code artifacts at build time or at pre-processing.

In an example, the computing device 102 can receive, via the network 110 and from storage device 108, the files 124-124N in order to cross-validate the files 124-124N and generate code to be executed at run-time by a business process automation platform. In an example, the files 124-124N can be of the same notation system, but contain information related to the disparate processes 126-126N. In other examples, the files 124-124N can be associated with different notation systems (e.g., a DMN file and a BPMN file). The different processes 126-126N can comprise the disparate tasks 128-128N, 130-130N, and 132-132N that may use different semantics, different syntax, different names, and different signatures, even if referring to the same steps, resources, or events. The cross-validation performed by the computing device 102 can be phased, with different cross-validation steps being performed concurrently or in sequence based on successful completion of earlier steps. The cross-validation can facilitate identifying matching tasks between the plurality of processes 126-126N so that code generated will interoperate between the files 124-124N.

In an example, the phased cross-validation process can start by the semantic error checker 112 performing semantic error checking to identify any semantic errors in any of files 124-124N. Semantic errors can be structural errors where the processes 126-126N described by the tasks 128-128N, 130-130N, and 132-132N contain errors that would produce inconsistent results, or be difficult or impossible to process. An example of a semantic error would be if the task 128 does not have an identifier declaration before it is referred to in the process 126 (e.g., a process variable). If a semantic error is identified by the semantic error checker 112, the semantic error checker 112 can generate an error notification that comprises information relating to the type of error, which task or tasks are associated with the error, and which files 124-124N contain the error. If no errors are identified, the semantic error checker 112 can generate a notification indicating that semantic error checking is complete and/or that the semantic error checking is successful.

Concurrently, syntax error checker 114 can perform syntax error checking to identify any semantic errors in any of files 124-124N. Syntax errors can be errors where the code in the files 124-124N is not valid according to grammar rules associated with the notation system or format with which the files 124-124N are associated. An example of a syntax error would be if the task 128 has associated code with missing semicolons, undeclared variables, or mismatched parentheses or braces. In the context of business processes, a syntax error could also include steps that are connected illegally or are improper. For example, two tasks cannot be connected directly by two arrows that go in the opposite direction. If a syntax error is identified by the syntax error checker 114, the syntax error checker 114 can generate an error notification that comprises information relating to the type of error, which task or tasks are associated with the error, and/or which of the files 124-124N contain the error. If no errors are identified, the syntax error checker 114 can generate a notification indicating that semantic error checking is complete and/or that the semantic error checking is successful.

The name resolver 116 can collect a list of names used in the files 124-124N. In an example, the name resolver 116 can operate after the error checking by the semantic error checker 112 and the syntax error checker 114 is complete. In other examples, the name resolver 116 can operate concurrently or simultaneously while the error checking by the semantic error checker 112 and the syntax error checker 114 is ongoing. The name resolver 116 can identify the names (e.g., labels) that are used to describe or name the tasks 128-128N, 130-130N, and 132-132N in the files 124-124N. The name resolver 116 can generate respective compilations of names associated with each of the files 124-124N. In other examples, the name resolver 116 can generate a single list of names that includes names from the files 124-124N.

The signature resolver 118 can collect signatures associated with the names identified by the name resolver 116. In an example, the signature resolver 118 can operate after the error checking by the semantic error checker 112 and the syntax error checker 114 is complete. In other examples, the signature resolver 118 can operate concurrently or simultaneously while the error checking by the semantic error checker 112 and the syntax error checker 114 is ongoing. Signatures can include schemas for data models or function signatures for function invocations. In another example, the signature can be a list of the names of the process variables that are inputs to the tasks 128-128N, 130-130N, and 132-132N. The signatures can also include the types of process variable (e.g., number, string, etc.) together with a name of a rule set or DMN file that is to be invoked. For example, if a name of a task is "Determine eligibility" that takes as an input "Age: integer, Year: integer, School: string" and the name of a DMN invoked is "Determine_Student_Loan_Eligibility", a signature may be something of the form "Determine_Student_Loan_Eligibility (Age: integer, Year: integer, School: string)". The signature resolver 118 can generate respective compilations of signatures associated with each of the files 124-124N. In other examples, the signature resolver 118 can generate a single list of signatures that are associated with the files 124-124N.

After the names and signatures have been identified by the name resolver 116 and the signature resolver 118, and after the semantic error checker 112 and the syntax error checker 114 have indicated that error checking was successfully completed, the cross-validator 120 can verify that references to names present in the file 124 are defined within the same file 124 or within file 124N in order to find matching names. For example, if the file 124 is a BPMN type file that refers to a DMN name in the file 124N, it is a valid name if the cross-validator 120 determines that the DMN name exists in the file 124N. If there are mismatches, the cross-validator 120 can generate an error notification indicating the presence and type of mismatch.

The cross-validator 120 can also verify that names present in one file (e.g., the file 124) are used with a compatible signature (e.g., a function is invoked with arguments of the right types). For example, if the file 124 refers to DMN Determine_Student_Loan_Eligibility in the file 124N, the reference is valid, if in the file 124, the signature associated with the name Determine_Student_Loan_Eligibility accepts the list of variables associated with the name (e.g., "Age: integer, Year: integer, School: string"). If there are mismatches, the cross-validator 120 can generate an error notification indicating the mismatches.

After the cross-validator 120 determines that there are matching tasks that have been cross-validated across the tasks 128-128N, 130-130N, and 132-132N, the code generator 122 can generate code that can be executed at a later time by a business process automation platform. The code generated can utilize the matching and cross-validated names and signatures across the files 124-124N. The code generator 122 can generate any type of executable code, and is not limited to creating executable representations of the original files 124-124N.

The companion code generated by the code generator 122 can include (but not be limited to): representational state transfer (REST) endpoints; adapters for message receivers and producers (e.g., for cloud events); adapters for KNative events (e.g., on a Kogito® business process automation platform); Java mappings for data model representations; automated unit tests for REST endpoints; automated integration tests for the message adapters; generation of REST application programming interface (API) specification/manifests (OpenAPI); automated documentation of the business asset (e.g. entry points of a BPMN, decision services of a DMN, etc.); Kubernetes deployment templates; security policies and run-time validation through keycloak (e.g., in BPMN authorized users to a service/user task); and many other types of code.

Because the semantic error checker 112, the syntax error checker 114, the name resolver 116, the signature resolver 118, the cross-validator 120, and the code generator 122 are component of the computing device 102, functionality implemented by the semantic error checker 112, the syntax error checker 114, the name resolver 116, the signature resolver 118, the cross-validator 120, and the code generator 122 may be attributed to the computing device 102 generally. Moreover, in examples where the semantic error checker 112, the syntax error checker 114, the name resolver 116, the signature resolver 118, the cross-validator 120, and the code generator 122 comprise software instructions that program a processor device (e.g., the processor device 104) to carry out functionality discussed herein, functionality implemented by the semantic error checker 112, the syntax error checker 114, the name resolver 116, the signature resolver 118, the cross-validator 120, and the code generator 122 may be attributed herein to the processor device 104 of the computing device 102.

Finally, it is noted that while, for purposes of illustration and simplicity, the examples are illustrated as being implemented by a computing system that comprises a single computing device that in turn comprises a single processor device, in practice the examples disclosed herein may be implemented in a computing system that comprises any number of computing devices, each of which may comprise one or more processor devices. Thus, irrespective of the implementation, the examples may be implemented on a computing system that includes one or more computing devices, wherein the one or more computing devices comprise one or more processor devices, and the one or more processor devices are configured to implement functionality disclosed herein.

Figure 2:
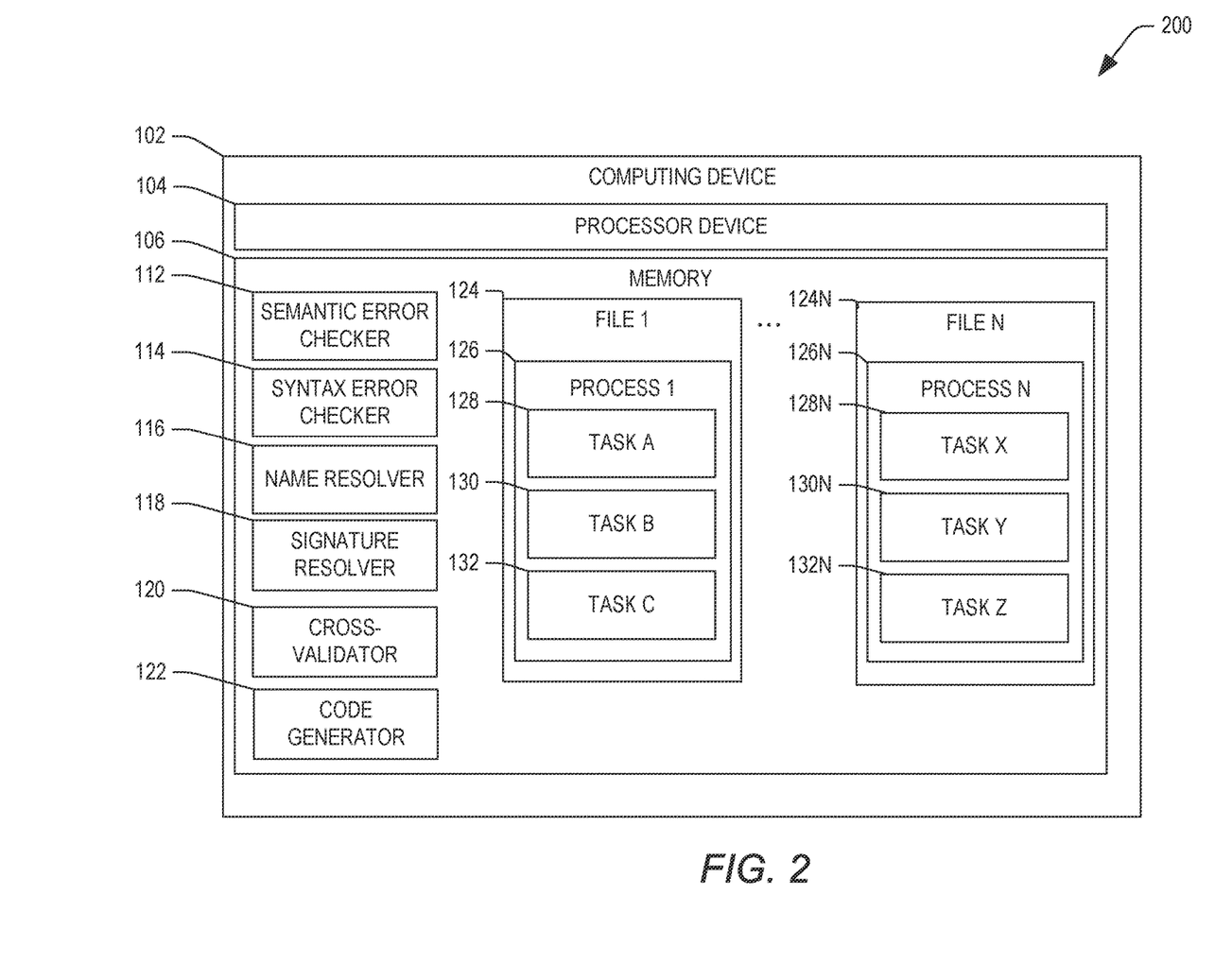
FIG. 2 illustrates a block diagram of an example computing system for cross-validating files to facilitate code generation in accordance with various aspects of the subject disclosure.

Turning now to FIG. 2, illustrated is a block diagram of an example computing system 200 for cross-validating files to facilitate code generation in accordance with various aspects of the subject disclosure. The system 200 in FIG. 2 depicts a different configuration of the computing system 100 shown in FIG. 1. Instead of the storage device 108 being separate from the computing device 102, and communicatively coupled via the network 110, in the example shown in FIG. 2, the files 124-124N can be stored in the memory 106 or in a storage device within the computing device 102.

Figure 3:
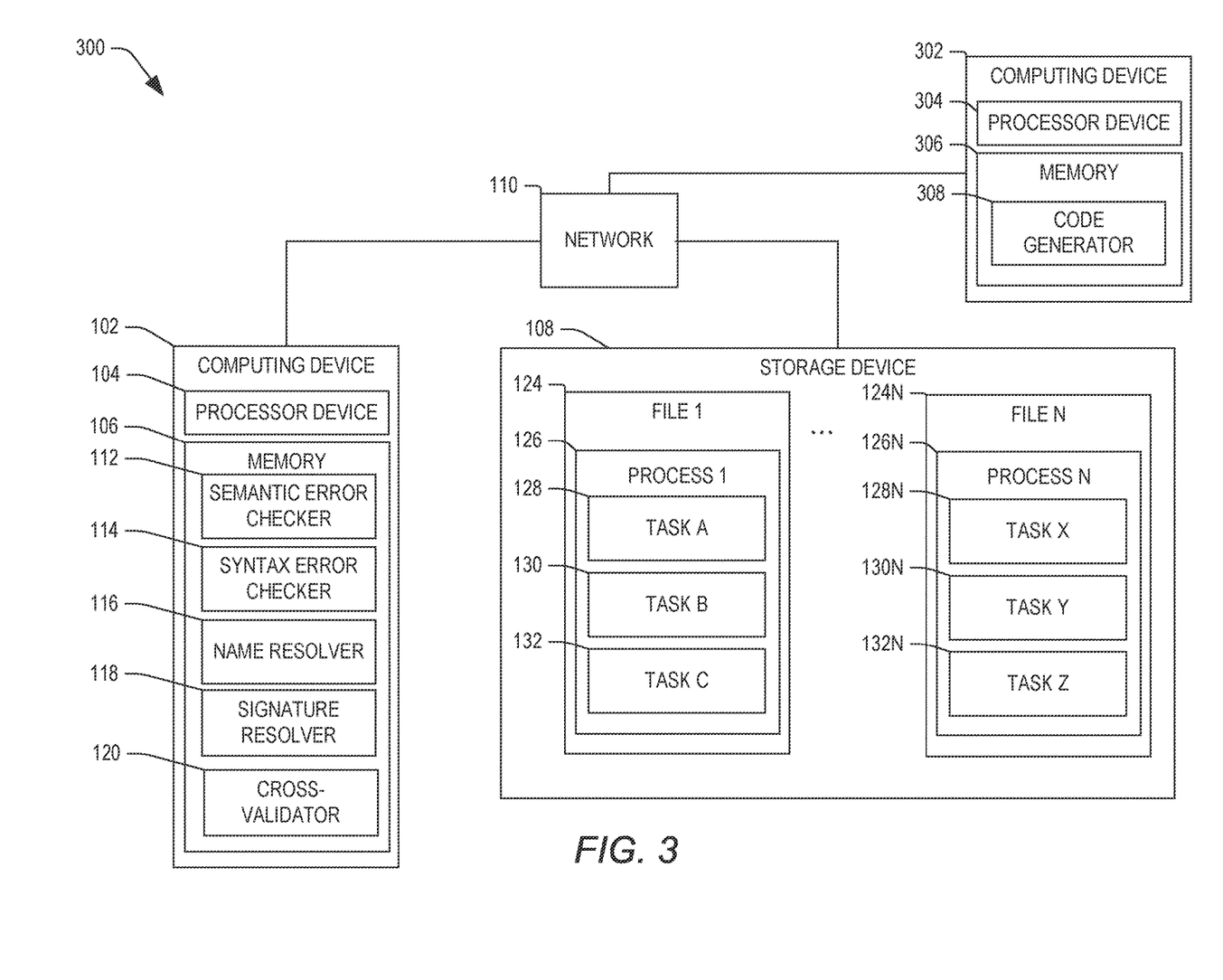
FIG. 3 illustrates a block diagram of an example computing system for cross-validating files to facilitate code generation in accordance with various aspects of the subject disclosure.

In FIG. 3, illustrated is a block diagram of an example computing system 300 for cross-validating files to facilitate code generation in accordance with various aspects of the subject disclosure. The computing system 300 in FIG. 3 depicts a different configuration of the computing system 100 shown in FIG. 1.

In the computing system 300, the computing device 102 can perform all the steps of the process through cross-validation, and then a computing device 302 can be provided to generate code for run-time execution. The computing device 302 can include a processor device 304 and a memory 306 that can store a code generator 308 that generates the code to be executed. In other examples, the division of the phases of the cross-validation and code generations can be split up differently, with one or more computing devices performing error checking, another computing device performing name and signature resolution, another computing device cross-validating the names and signatures, and yet another computing device generating code.

Figure 4:
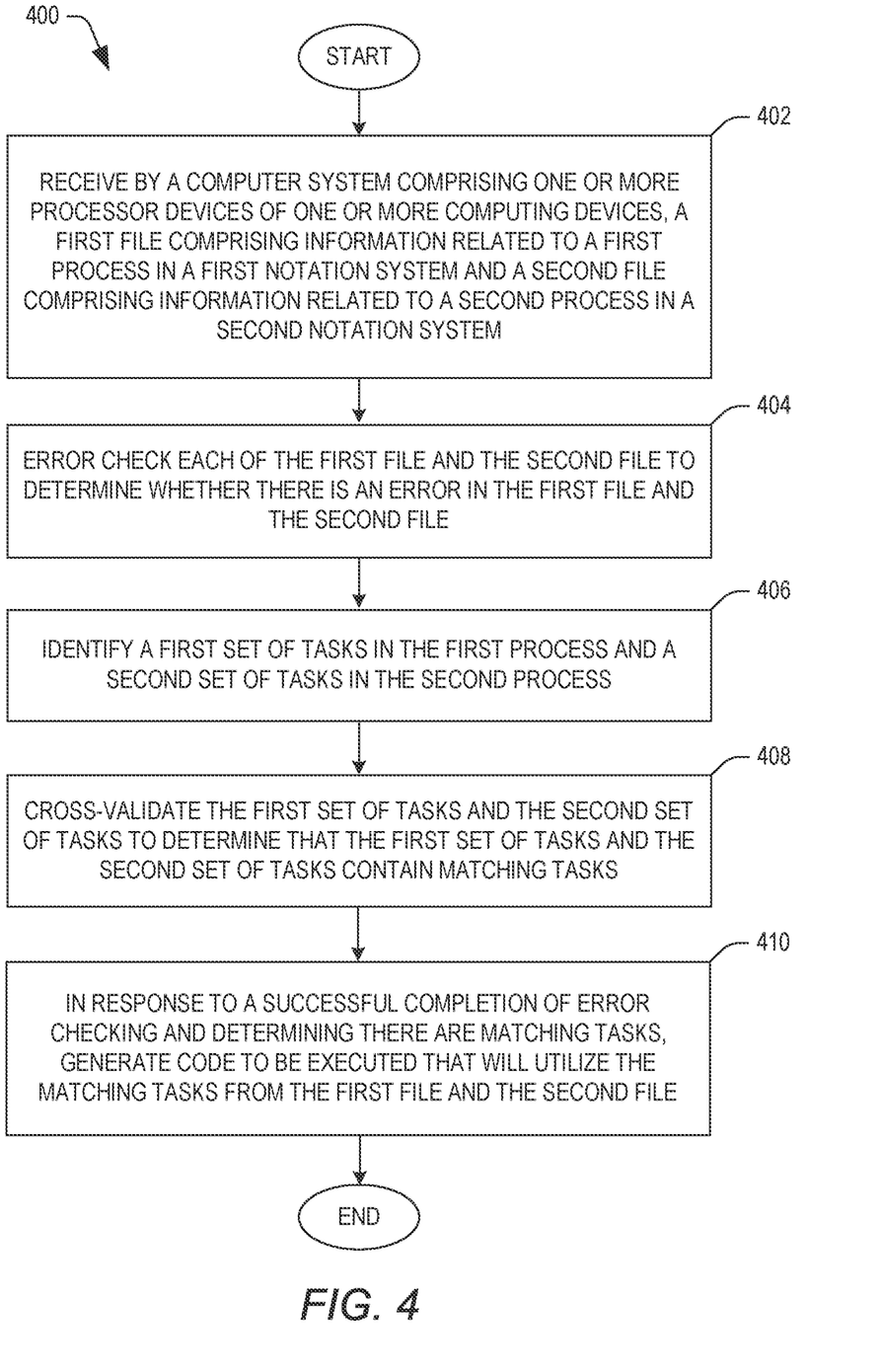
FIG. 4 illustrates a flowchart of an example method for cross-validating files to facilitate code generation in accordance with various aspects of the subject disclosure.

FIG. 4 illustrates a process in connection with the aforementioned computing systems 100, 200, and/or 300. FIG. 4 will be discussed in conjunction with FIG. 1. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

Turning now to FIG. 4, illustrated is a flowchart of an example method 400 for cross-validating files to facilitate code generation.

At step 402, the method 400 can include receiving, by the computing device 102 comprising one or more processor devices (e.g., the processor device 104) of one or more computing devices, the first file 124 comprising information related to the first process 126 in a first notation system (e.g., BPMN) and the second file 124N comprising information related to the second process 126N in a second notation system (e.g., DMN).

At step 404, the method 400 can include error checking for each of the first file 124 and the second file 124N to determine whether there is an error in the first file 124 and the second file 124-N. The error checking can include semantic error checking by the semantic error checker 112 and syntax error checking by the syntax error checker 114.

At step 406, the method 400 can include identifying a first set of tasks (e.g., the tasks 128, 130, and 132) in the first process 126 and a second set of tasks (e.g., the tasks 128N, 130N, and 132N) in the second process 126N. Identifying the tasks can include identifying labels (e.g., names) associated with the tasks by the name resolver 116 and also identifying process variables and types associated with the labels (e.g., signatures) by the signature resolver 118.

At step 408, the method 400 can include cross-validating, by the cross-validator 120, the first set of tasks and the second set of tasks to determine that the first set of tasks and the second set of tasks contain matching tasks cross-validating the first set of tasks and the second set of tasks to determine that the first set of tasks and the second set of tasks contain matching tasks.

At step 410, if there are matching tasks and error checking is successfully completed, the method 400 can include generating code, by the code generator 122 to be executed that will utilize the matching tasks from the first file 124 and the second file 124N.

Figure 5:
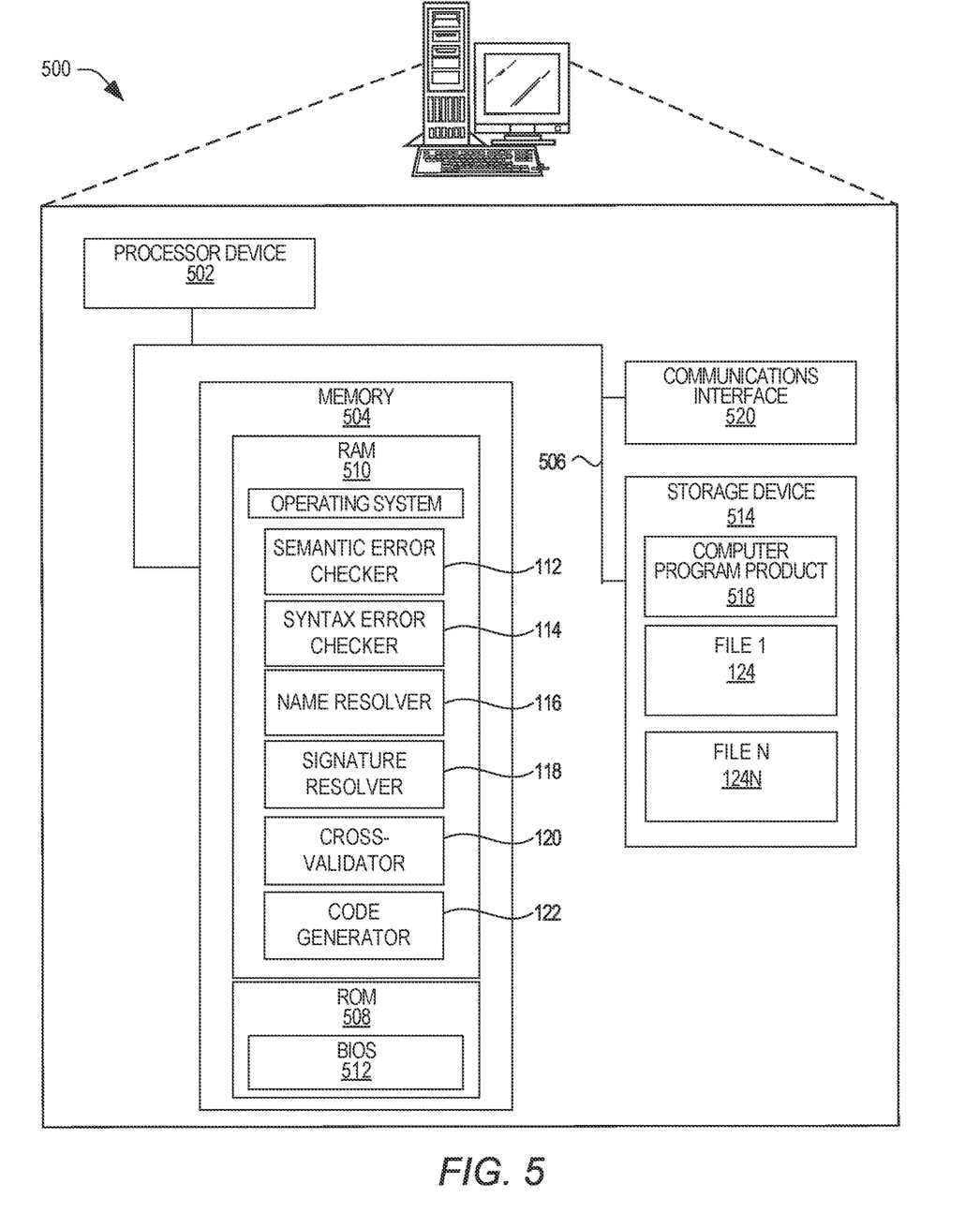
FIG. 5 illustrates an example block diagram of a computer that can be operable to execute processes and methods in accordance with various aspects of the subject disclosure.

FIG. 5 is a block diagram of a computing device 500 suitable for implementing the computing device 102 according to one example. The computing device 500 may comprise any computing or electronic device capable of including firmware, hardware, and/or executing software instructions to implement the functionality described herein, such as a computer server, a desktop computing device, a laptop computing device, a smartphone, a computing tablet, or the like. The computing device 500 includes a processor device 502, a system memory 504, and a system bus 506. The system bus 506 provides an interface for system components including, but not limited to, the system memory 504 and the processor device 502. The processor device 502 can be any commercially available or proprietary processor.

The system bus 506 may be any of several types of bus structures that may further interconnect to a memory bus (with or without a memory controller), a peripheral bus, and/or a local bus using any of a variety of commercially available bus architectures. The system memory 504 may include non-volatile memory 508 (e.g., read-only memory (ROM), erasable programmable read-only memory (EPROM), electrically erasable programmable read-only memory (EEPROM), etc.), and volatile memory 510 (e.g., random-access memory (RAM)). A basic input/output system (BIOS) 512 may be stored in the non-volatile memory 508 and can include the basic routines that help to transfer information between elements within the source computing device 500. The volatile memory 510 may also include a high-speed RAM, such as static RAM, for caching data.

The computing device 500 may further include or be coupled to a non-transitory computer-readable storage medium such as a storage device 514, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 514 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed examples.

A number of modules can be stored in the storage device 514 and in the volatile memory 510, including an operating system and one or more components, such as the semantic error checker 112, the syntax error checker 114, the name resolver 116, the signature resolver 118, the cross-validator 120, and the code generator 122 if the computing device 500 is implementing the computing device 102. Such components may implement the functionality described herein in whole or in part. It is to be appreciated that the examples can be implemented with various commercially available operating systems or combinations of operating systems.

The files 124-124N can also be stored in the storage device 514. All or a portion of the examples may be implemented as a computer program product 518 stored on a transitory or non-transitory computer-usable or computer-readable storage medium, such as the storage device 514, which includes complex programming instructions, such as complex computer-readable program code, to cause the processor device 502 to carry out the steps described herein. Thus, the computer-readable program code can comprise software instructions for implementing the functionality of the examples described herein when executed on the processor device 502.

The computing device 500 may also include a communications interface 520 suitable for communicating with a mobile wireless network or other computing devices as appropriate or desired.

Those skilled in the art will recognize improvements and modifications to the preferred embodiments of the disclosure. All such improvements and modifications are considered within the scope of the concepts disclosed herein and the claims that follow.

What is claimed is:

1. A method comprising:
   receiving, by a computing system comprising one or more processor devices of one or more computing devices, a first file comprising first information that identifies a first process, the first information comprising source instructions written to comply with a first notation system and a second file comprising second information that identifies a second process, the second information comprising source instructions written to comply with a second notation system;

determining, by the computing system, that the source instructions in the first file comply with the first notation system and that the source instructions in the second file comply with the second notation system;

generating, by the computing system, a list that identifies a first set of labels of a first set of tasks in the first process and a second set of labels of a second set of tasks in the second process, the list identifying, for a second task in the second set of tasks, a label of the second task and a name and a type of a process variable that comprises an input to the second task;

cross-validating, by the computing system based at least in part on the list, the first set of tasks and the second set of tasks to determine that the first set of tasks includes a first task that invokes a label of a second task in the second set of tasks;

determining, by the computing system based at least in part on the list, that the first task invokes the label of the second task using an argument that is a same type of process variable as the type of process variable that comprises the input to the second task; and in response to determining that the source instructions in the first file comply with the first notation system and that the source instructions in the second file comply with the second notation system and determining that the first set of tasks includes the first task that invokes the label of the second task in the second set of tasks using the argument that is the same type of process variable as the type of process variable that comprises the input to the second task, generating, by the computing system, executable code to be executed that will utilize the first task from the first file and the second task from the second file.

2. The method of claim 1, wherein determining that the source instructions in the first file comply with the first notation system and that the source instructions in the second file comply with the second notation system further comprises:
   checking for a semantic error in either the first file or the second file; and
   checking for a syntax error in either the first file or the second file.

3. The method of claim 2, further comprising:
   in response to identifying at least one of the semantic error or the syntax error, generating an error notification comprising information identifying the error.

4. The method of claim 2, wherein the semantic error comprises a task that has an identifier referral preceding an identifier declaration.

5. The method of claim 2, wherein the syntax error comprises a first task and a second task that are linked together incorrectly.

6. The method of claim 1, wherein at least one of the first notation system and the second notation system are at least one of Decision Modeling and Notation (DMN), Business Process Model Notation (BPMN), Predictive Model Markup Language (PMML), and Drools Rule Language (DRL), and the first notation system is different from the second notation system.

7. The method of claim 1, further comprising:
    determining, by the computing system based at least in part on the list, that the second set of tasks includes a third task that invokes a label of a fourth task in the first set of tasks; and
    determining, by the computing system based at least in part on the list, that the third task invokes the label of the fourth task using an argument that is a same type of process variable as a type of process variable that comprises an input to the fourth task.

8. The method of claim 1, wherein the first notation system comprises a first non-executable business process modeling language, and wherein the second notation system comprises a second non-executable business process modeling language different than the first non-executable business process modeling language.

9. A computing system comprising:
    one or more computing devices, the one or more computing devices comprising one or more processor devices, the one or more processor devices to:
        receive a first file comprising first information that identifies a first process, the first information comprising source instructions written to comply with a first notation system and a second file comprising second information that identifies a second process, the second information comprising source instructions written to comply with a second notation system;
        determine that the source instructions in the first file comply with the first notation system and that the source instructions in the second file comply with the second notation system;
        generate a list that identifies a first set of labels of a first set of tasks in the first process and a second set of labels of a second set of tasks in the second process, the list identifying, for a second task in the second set of tasks, a label of the second task and a name and a type of a process variable that comprises an input to the second task;
        cross-validate, based at least in part on the list, the first set of tasks and the second set of tasks to determine that the first set of tasks includes a first task that invokes a label of a second task in the second set of tasks;
        determine, based at least in part on the list, that the first task invokes the label of the second task using an argument that is a same type of process variable as the type of process variable that comprises the input to the second task; and
        in response to determining that the source instructions in the first file comply with the first notation system and that the source instructions in the second file comply with the second notation system and determining that the first set of tasks includes the first task that invokes the label of the second task in the second set of tasks using the argument that is the same type of process variable as the type of process variable that comprises the input to the second task, generate executable code to be executed that will utilize the first task from the first file and the second task from the second file.

10. The computing system of claim 9, wherein to determine that the source instructions in the first file comply with the first notation system and that the source instructions in the second file comply with the second notation system, the one or more processor devices are further to:
    check for a semantic error in either the first file or the second file; and
    check for a syntax error in either the first file or the second file.

11. The computing system of claim 10, wherein the one or more processor devices further:
    in response to identifying at least one of the semantic error or the syntax error, generate an error notification comprising information identifying the error.

12. The computing system of claim 9, wherein at least one of the first notation system and the second notation system are at least one of Decision Modeling and Notation (DMN), Business Process Model Notation (BPMN), Predictive Model Markup Language (PMML), and Drools Rule Language (DRL), and the first notation system is different from the second notation system.

13. A non-transitory computer-readable storage medium that includes executable instructions to cause one or more processor devices of one or more computing devices to:
    receive a first file comprising first information that identifies a first process, the first information comprising source instructions written to comply with a first notation system and a second file comprising second information that identifies a second process, the second information comprising source instructions written to comply with a second notation system;
    determine that the source instructions in the first file comply with the first notation system and that the source instructions in the second file comply with the second notation system;
    generate a list that identifies a first set of labels of a first set of tasks in the first process and a second set of labels of a second set of tasks in the second process, the list identifying, for a second task in the second set of tasks, a label of the second task and a name and a type of a process variable that comprises an input to the second task;
    cross-validate, based at least in part on the list, the first set of tasks and the second set of tasks to determine that the first set of tasks includes a first task that refers to a label of a second task in the second set of tasks;
    determine, based at least in part on the list, that the first task invokes the label of the second task using an argument that is a same type of process variable as the type of process variable that comprises the input to the second task; and
    in response to determining that the source instructions in the first file comply with the first notation system and that the source instructions in the second file comply with the second notation system and determining that the first set of tasks includes the first task that invokes the label of the second task in the second set of tasks using the argument that is the same type of process variable as the type of process variable that comprises the input to the second task, generate executable code to be executed that will utilize the first task from the first file and the second task from the second file.

14. The non-transitory computer-readable storage medium of claim 13, wherein, to cross-validate the first set of tasks and the second set of tasks, the one or more processor devices further:
    determine that a first process variable and a first type associated with a first label corresponding to the first task matches a second process variable and a second type associated with a second label corresponding to the second task.

* * * * *